United States Patent
Disley et al.

(10) Patent No.: US 12,533,981 B2
(45) Date of Patent: Jan. 27, 2026

(54) V2V CHARGING SYSTEM AND METHOD

(71) Applicant: Volvo Car Corporation, Gothenburg (SE)

(72) Inventors: Jonathan Disley, Gothenburg (SE); Tong Li, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 863 days.

(21) Appl. No.: 17/854,035

(22) Filed: Jun. 30, 2022

(65) Prior Publication Data

US 2023/0012166 A1    Jan. 12, 2023

(51) Int. Cl.
| | |
|---|---|
| *B60L 53/66* | (2019.01) |
| *B60L 53/30* | (2019.01) |
| *B60L 53/68* | (2019.01) |
| *H02J 7/00*  | (2006.01) |
| *H02J 7/34*  | (2006.01) |

(52) U.S. Cl.
CPC ............ *B60L 53/66* (2019.02); *B60L 53/305* (2019.02); *B60L 53/32* (2019.02); *B60L 53/68* (2019.02); *H02J 7/00034* (2020.01); *H02J 7/0048* (2020.01); *H02J 7/342* (2020.01)

(58) Field of Classification Search
CPC .......... B60L 53/66; B60L 53/68; B60L 53/32; B60L 53/305
USPC ......................................................... 320/109
See application file for complete search history.

(56) References Cited

U.S. PATENT DOCUMENTS

| | | | | |
|---|---|---|---|---|
| 11,846,515 B2* | 12/2023 | Kim | ........................ | G06F 21/84 |
| 12,092,694 B2* | 9/2024 | Leatherdale | ............ | H02J 7/005 |
| 12,240,341 B1* | 3/2025 | Pathipati | ................. | B60L 53/39 |
| 2013/0339072 A1* | 12/2013 | Touge | .................... | B60L 53/66 |
| | | | | 705/5 |

(Continued)

FOREIGN PATENT DOCUMENTS

| | | |
|---|---|---|
| CN | 106595693 A | 4/2017 |
| CN | 108332767 A | 7/2018 |

(Continued)

OTHER PUBLICATIONS

Jan. 23, 2025 Office Action issued in corresponding CN Application No. 202110742086.5.

*Primary Examiner* — Nathaniel R Pelton
(74) *Attorney, Agent, or Firm* — Clements Bernard Walker; Christopher L. Bernard (57) ABSTRACT

A V2V charging system including an on-board system that includes a battery; a detection unit configured to detect a position of the EV, a battery condition of the battery and a destination of a current trip of the EV, wherein the battery condition includes an amount of remaining energy, a number of charge and discharge cycles, and current battery capacity; a communication unit configured to send a charge request to a server and receive one or more candidate charging solutions corresponding to the charge request from the server, the communication unit being further configured to send a selected charging solution that is selected by a user from the one or more candidate charging solutions to the server and receive a standstill charging location from the server; and a human-machine interface (HMI). The HMI includes a navigation module, an energy condition module, a charge request module, and a charging solution module.

13 Claims, 6 Drawing Sheets

(56) References Cited

U.S. PATENT DOCUMENTS

| 2022/0097540 | A1* | 3/2022 | Atluri | H02J 7/0048 |
| 2022/0194253 | A1* | 6/2022 | Salter | B60L 53/18 |
| 2022/0371464 | A1* | 11/2022 | Lu | B60L 53/305 |

FOREIGN PATENT DOCUMENTS

| CN | 109153338 A | 1/2019 |
| CN | 111497662 A | 8/2020 |
| DE | 102013001094 A1 | 7/2014 |
| WO | 2015081868 A1 | 6/2015 |

* cited by examiner

Charging solution module 154

Figure 4D

Charging guide module 155

V2V CHARGING SYSTEM AND METHOD

CROSS-REFERENCE TO RELATED APPLICATION

The present disclosure claims the benefit of priority of co-pending Chinese Patent Application No. 202110742086.5, filed on Jul. 1, 2021, and entitled "V2V Charging System and Method," the contents of which are incorporated in full by reference herein.

TECHNICAL FIELD

The present disclosure relates to a vehicle-to-vehicle (V2V) charging system and a V2V charging method.

BACKGROUND

Energy and environmental issues have increasingly become the focus of worldwide attention. Against this backdrop, the electric vehicle (EV) is becoming the mainstream vehicle type because of its cleanliness.

Despite its advantages, the EV is facing the problem of charging anxiety which needs to be solved urgently. Currently, finding an available charging station and queuing at the found charging station are both problems with the EV. A prior art solution is to provide charging robots in an area such as a parking lot. In this solution, a robot carrying rechargeable batteries is controlled to move to an EV that needs to be charged and charge the EV. This solution is applicable to the scenario of charging the EV at a specific area such as the parking lot, but is not applicable to the scenario such as a very large area or a complex traffic scene.

SUMMARY

In view of the problems in the prior art, the present disclosure aims to provide a V2V charging solution for an EV. According to the V2V charging solution, a number of factors including affordability, convenience and battery health are considered.

An embodiment of the disclosure provides a V2V charging system including an on-board system provided in an electric vehicle (EV). The on-board system includes a battery; a detection unit configured to detect a position of the EV, a battery condition of the battery and a destination of a current trip of the EV, wherein the battery condition includes an amount of remaining energy, a number of charge and discharge cycles, and current battery capacity; a communication unit configured to send a charge request to a server and receive one or more candidate charging solutions corresponding to the charge request from the server, the communication unit being further configured to send a selected charging solution that is selected by a user from the one or more candidate charging solutions to the server and receive a suitable charging location from the server; and a human-machine interface (HMI). The HMI includes a navigation module configured to present the standstill parking position; an energy condition module configured to present the battery condition; a charge request module configured to generate the charge request including the position of the EV, the battery condition, and the destination; and a charging solution module configured to present the one or more candidate charging solutions each of which includes a charging amount as well as a charging time and a total fee corresponding to the charging amount.

An embodiment of the disclosure provides a V2V charging method for an EV including the steps of: detecting a position of the EV, a battery condition of a battery of the EV and a destination of a current trip of the EV, the battery condition including an amount of remaining energy, a number of charge and discharge cycles, and current battery capacity; presenting the detected information on an HMI of the EV; sending a charge request to a server if the EV cannot reach the destination with the amount of the remaining energy; receiving one or more candidate charging solutions corresponding to the charge request from the server, each candidate charging solution including an amount of energy supplied by a supply EV, a charging time and a total fee corresponding to the amount of energy; presenting the one or more candidate charging solutions on the HMI; receiving a user input indicative of a selected charging solution that is selected from the one or more candidate charging solutions; sending the selected charging solution to the server; and receiving a suitable charging location for the V2V charging from the server.

BRIEF DESCRIPTION OF THE DRAWINGS

The disclosed aspects will hereinafter be described in connection with the appended drawings that are provided to illustrate but not to limit the scope of the disclosure.

DETAILED DESCRIPTION

Embodiments of one aspect of the disclosure relate to a V2V charging system. In this system, an EV has both the function of transportation and the function of energy storage. When a large number of EVs are connected and can be dispatched, these EVs can work as a mobile charging plant. In such a mobile charging plant, an EV not only knows where there is "electricity," but also determines where there is suitable "electricity." Thus, such a V2V charging system can greatly facilitate the establishment of smart cities.

According to an embodiment of the V2V charging system, it won't be an issue to find an available charging station or have to queue at the found charging station. When an EV needs to be charged, the V2V charging system can find a supply EV that provides energy to the to-be-charged EV. The V2V charging system also can provide charging solutions suitable for the to-be-charged EV.

According to an embodiment of the V2V charging system, a number of factors including affordability, convenience and battery health are taken into account. Thus, such a V2V charging system can not only solve the problem of charging anxiety, but also can recommend a suitable supply EV as well as a suitable charging solution.

According to an embodiment of the V2V charging system, during the whole process of V2V charging (e.g., from a request for charging to the end of the charging), via specifically configured interface elements that can be seen, touched or input by a user on the HMI (Human Machine Interface) of the EV, the user can interact with an OBU (on board unit) of the EV with a simple operation. Thus, the complexity that the user participates in the V2V charging process is greatly reduced, and the user experience is greatly improved.

Figure 1:
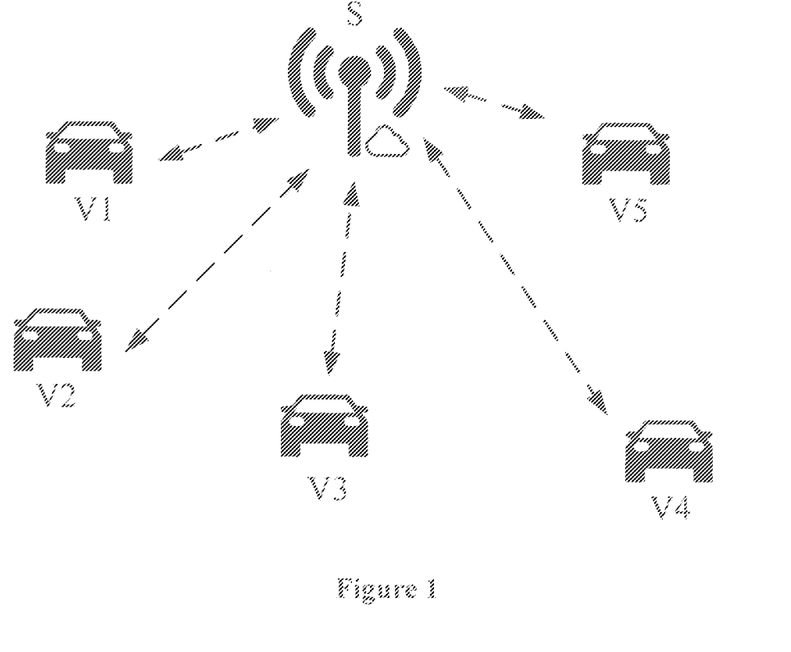
FIG. 1 is an exemplary environment in which an embodiment of the disclosure can be implemented.

FIG. 1 schematically illustrates an exemplary environment in which embodiments of the disclosure can be implemented. As shown in FIG. 1, the environment includes a server S and a plurality of EVs V1-V5. The environment constitutes an ecological environment for the V2V charging and is an application environment for the V2V charging according to an embodiment of the present disclosure.

The server S wirelessly communicates with each of the EVs V1-V5 in the environment to interact with the electric vehicles V1-V5 respectively. V2V communications can be implemented among the EVs V1-V5. Considering the limitations of communication range and stability of V2V communication, the V2V charging according to embodiments of the disclosure is realized by means of information interaction between the EVs and the server, without depending on communications between the EVs. For example, the server S is a cloud server or an edge server.

Each of the EVs V1-V5 can be an EV to be charged or a supply EV that supplies energy (i.e., an EV that functions as a "mobile charger"). For example, the EV V1 has insufficient power and needs to be charged. One of the EVs V2-V5 may become the supply EV that supplies electric energy to the EV V1. According to an embodiment of the disclosure, both a suitable supply EV and a suitable charging solution are provided.

It is noted that the term "electric vehicle (EV)" used herein encompasses battery electric vehicles (BEVs), hybrid electric vehicles (HEVs), and plug-in electric vehicles (PHEVs).

Figure 2:
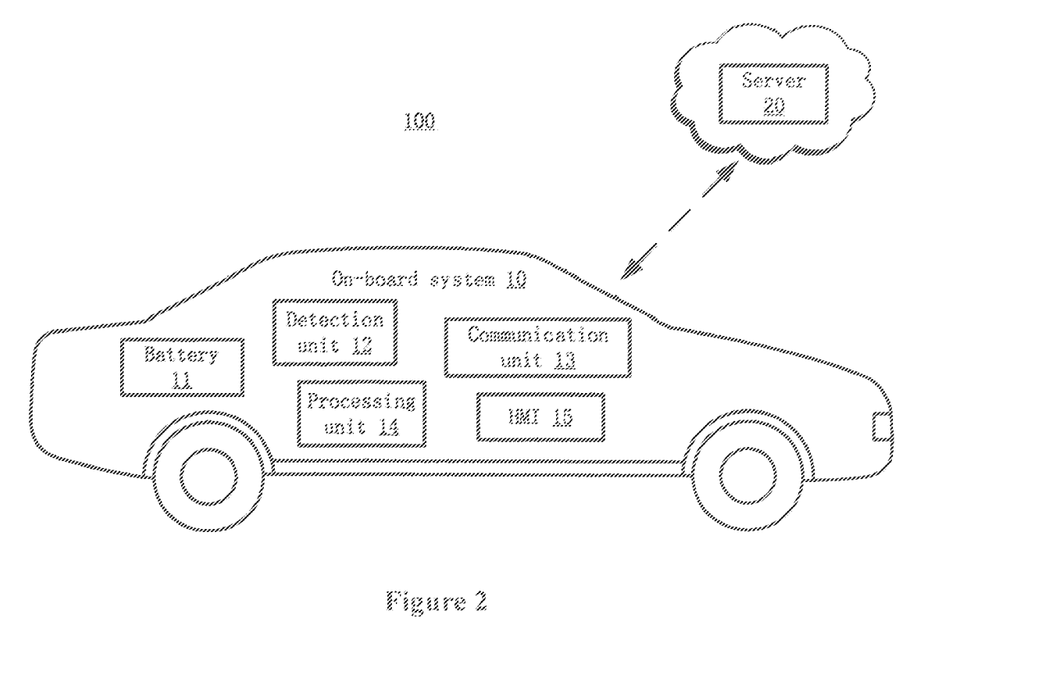
FIG. 2 is a schematic block diagram of a V2V charging system according to an embodiment of the disclosure.

FIG. 2 illustrates a V2V charging system 100 according to an embodiment of the disclosure. The V2V charging system 100 includes an on-board system 10 provided on/in an EV and a server 20 wirelessly connected to the on-board system 10.

Referring to FIG. 2, the on-board system 10 includes a battery 11, a detection unit 12, a communication unit 13, a processing unit 14, and an HMI 15.

The battery 11 serves as an energy storage power source for the EV. The battery 11, for example, is a storage battery.

The detection unit 12 detects a position of the EV, a battery condition of the battery 11 and a destination of a current trip of the EV. The battery condition includes an amount of remaining energy, a number of charge and discharge cycles, and current battery capacity of the battery 11.

In an example, the detection unit 12 includes a first detection unit (e.g., a positioning device) for determining the position of the EV, a second detection unit (e.g., one or more sensors for measuring the amount of remaining energy, the number of charge and discharge cycles, and the current battery capacity of the battery 11) for detecting the battery condition of the battery 11, and a third detection unit (e.g., a software module for identifying the destination from the user's trip calendar) for detecting the destination of the current trip.

The communication unit 13 provides wireless communications between the EV and the server 20. For example, the on-board system 10 transmits information (e.g., a charge request or a charging solution selected by the user) to the server 20 via the communication unit 13 and receives information (e.g., a plurality of candidate charging solutions, a recommended charging solution, or a standstill charging location) from the server 20 via the communication unit 13. The wireless communications between the communication unit 13 and the server 20 are for example realized by means of 3G/4G/5G, C-V2X, DSRC, WiFi or Bluetooth and various combinations thereof.

The processing unit 14 processes information from the detection unit 12, the communication unit 13 and the HMI 15. For example, the processing unit 14 determines whether the remaining energy can allow the EV to reach the destination of the current trip based on the information from the detection unit 12.

The processing unit 14 can be implemented by means of hardware or software or a combination of hardware and software, including code stored in a non-transitory computer-readable medium and implemented as instructions executed by a processor. Regarding implementation by means of hardware, it may be implemented in an application-specific integrated circuit (ASIC), a digital signal processor (DSP), a data signal processing device (DSPD), a programmable logic device (PLD), a field programmable gate array (FPGA), a processor, a controller, microcontroller, a microprocessor, an electronic unit, or a combination thereof. The implementation by software may include microcode, program code or code segments. The software may be stored in a machine-readable storage medium, such as a memory. The processing unit 14 can be implemented in the same chip or circuit, or may be implemented in multiple chips or circuits.

The HMI 15 is used to provide interactions between the user and the OBU of the EV, for example, provide the interactions during the V2V charging. The HMI 15 includes a graphical user interface (GUI) with functions of providing various services such as navigations and convenient operations.

Figure 3:
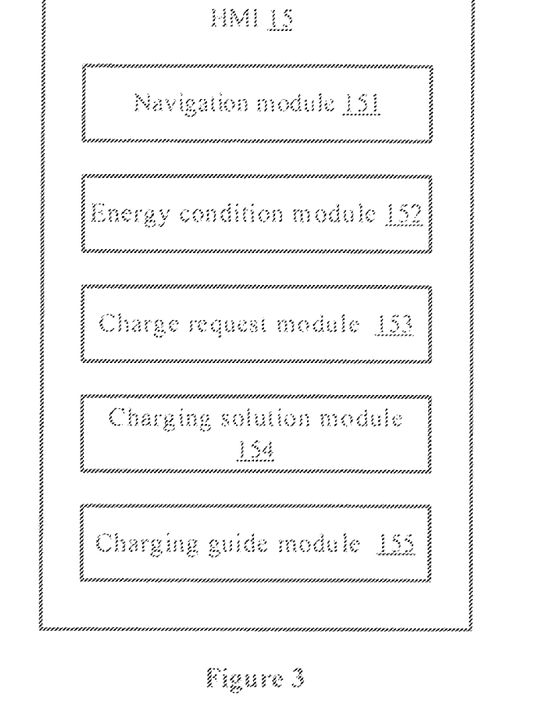
FIG. 3 is a schematic block diagram of a human-machine interface (HMI) of the V2V charging system illustrated in FIG. 2 according to an embodiment of the disclosure.

FIG. 3 illustrates an embodiment of the HMI 15. As shown in FIG. 3, the HMI 15 includes a navigation module 151, an energy condition module 152, a charge request module 153, a charging solution module 154, and a charging guide module 155. FIGS. 4A-4E show an exemplary implementations of the modules of the HMI 15. Each of the modules includes a GUI (graphic user interface) for interacting with the user.

It is noted that interface elements presented on the modules of the HMI 15 as well as the manner in which those interface elements are presented can be personalized and can be adjusted, for example, hidden, added, deleted, or can change the position, color, or size of those interface elements. The interface elements of the HMI 15 are adjusted based on user requirements or application scenarios. Such an adjustment can be implemented by user's edits to one or more interface elements on the GUI, or by background settings customized according to the user requirements or application scenarios.

Figure 4A:
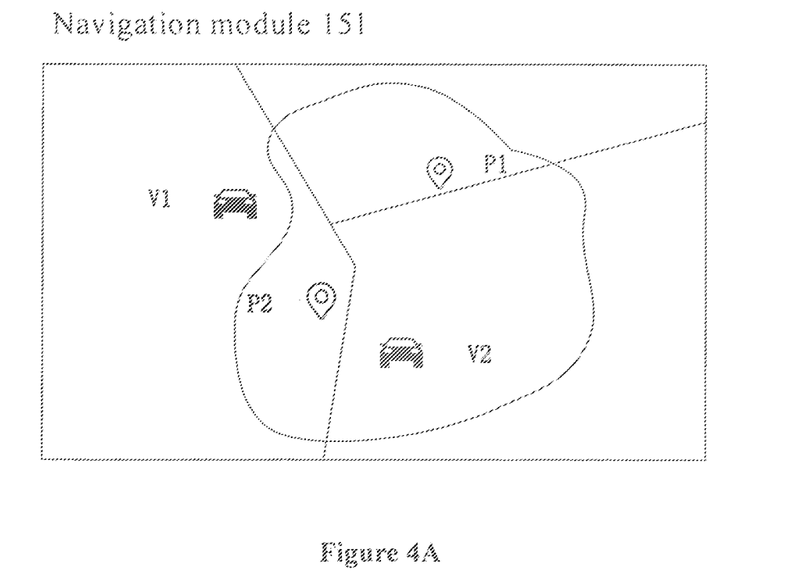
FIGS. 4A-4E are schematic diagrams showing modules of the HMI illustrated in FIG. 3 according to an embodiment of the disclosure.
Figure 4B:
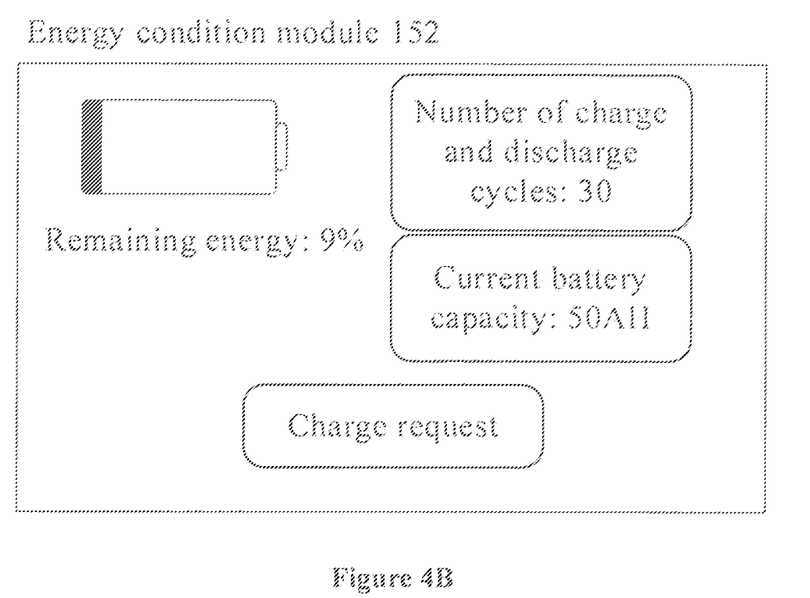
Figure 4C:
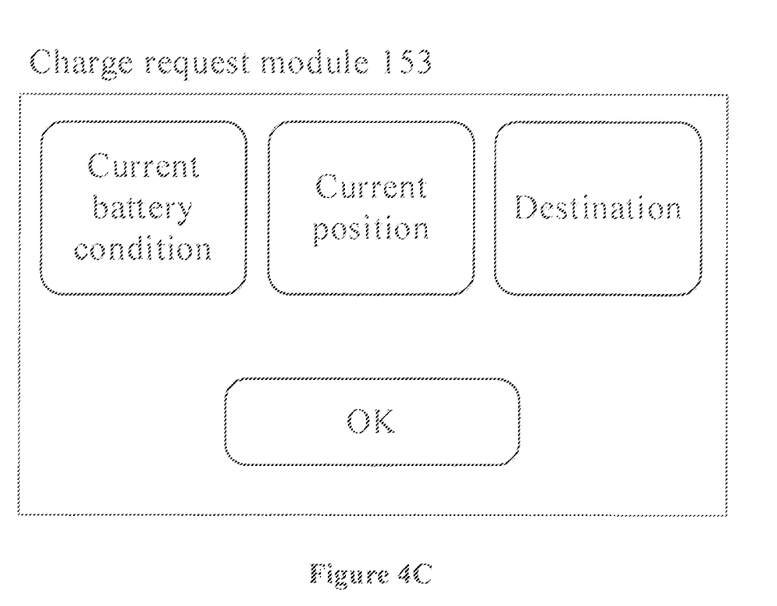
Figure 4D:
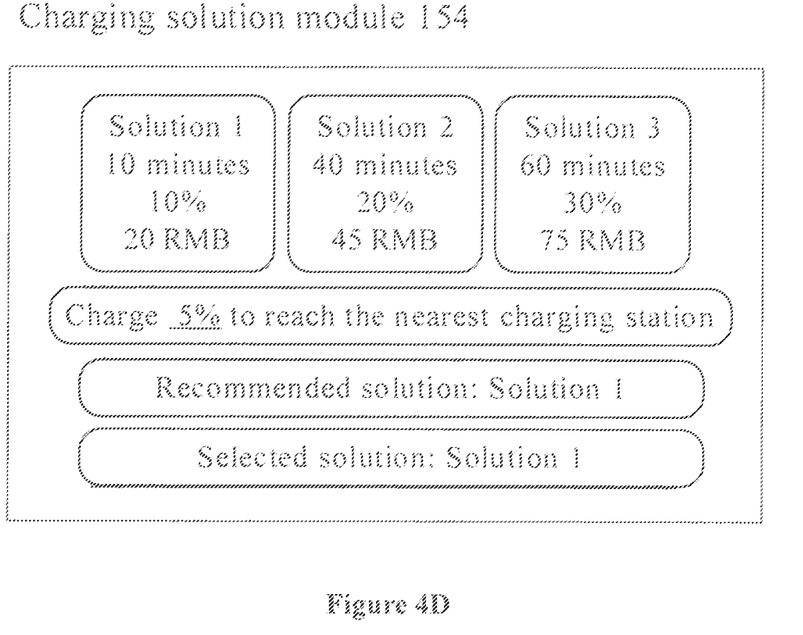
Figure 4E:
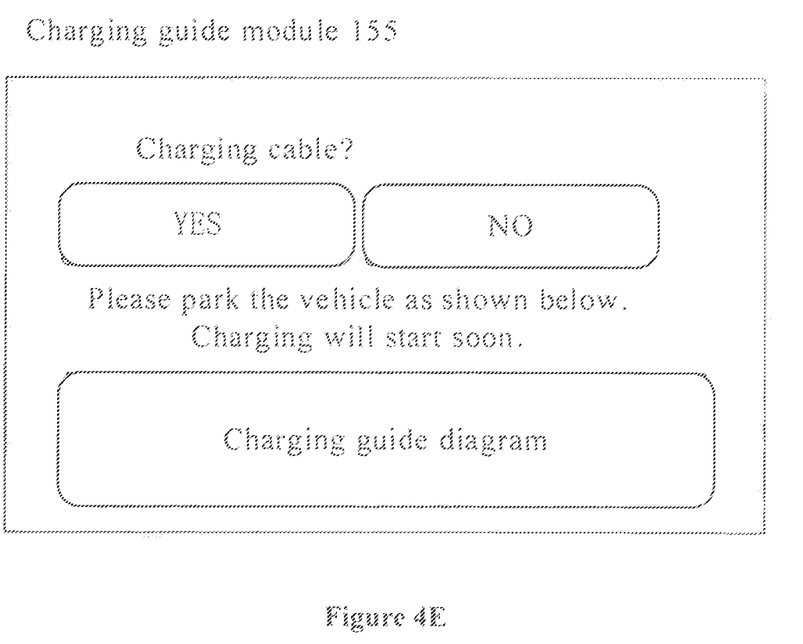
Figure 5:
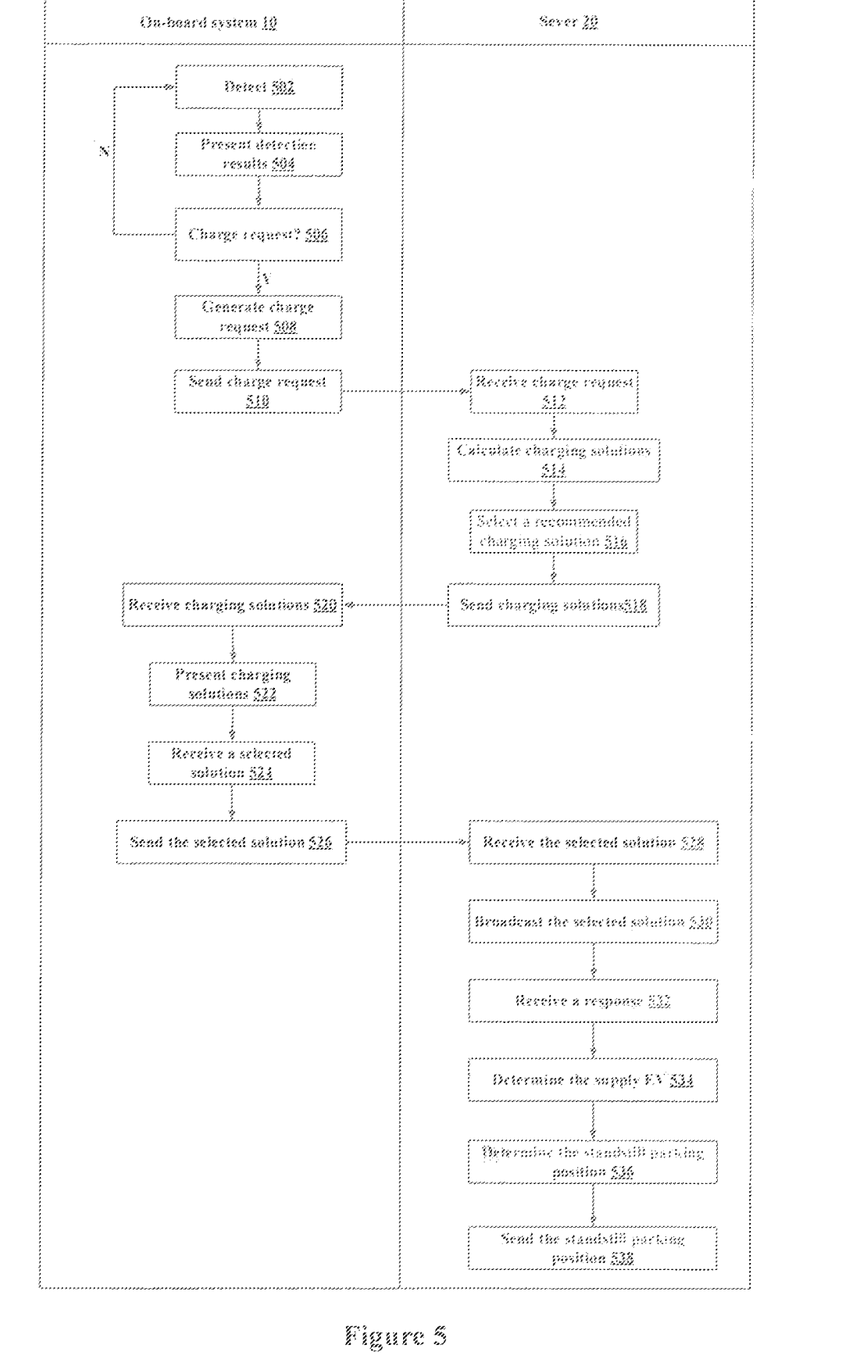
FIG. 5 is a flowchart of an operation process of the V2V charging system illustrated in FIG. 2 according to an embodiment of the disclosure.

FIG. 5 schematically illustrates an operation process 500 of the V2V charging system 100. The operation process 500 of the V2V charging system 100 will be described with reference to FIG. 5 and FIGS. 4A-4E.

In block 502, the detection unit 12 detects the position of the EV (e.g., the EV V1 shown in FIG. 1), the battery condition of the battery 11, and the destination of the current trip of the EV1. Then, the detection unit 12 generates detection results.

In block 504, the HMI 15 provides the detection results, for example, by presenting the detection results on the GUI or by a voice broadcast.

In one example, a map including a travelling area of the EV V1 is presented on the navigation module 151. The position of the EV V1 (see "V1" in FIG. 4A) as well as the destination (see "P1" in FIG. 4A) are presented on the map. The amount of the remaining energy of the battery 11 is presented on the battery condition module 152 (see "Remaining energy: 9%" in FIG. 4B). The number of charge and discharge cycles of the battery 11 is presented on the battery condition module 152 (see "Number of charge and discharge cycles: 30" in FIG. 4B). One charge and discharge cycle includes a process of charging and discharging. The current battery capacity is presented on the battery condition module 152 (see "Current battery capacity: 50 AH" in FIG. 4B). The battery capacity of the battery 11 will decrease with use due to battery aging.

In block 506, the processing unit 14 determines whether to trigger a charge request based on the remaining energy of the battery 11.

In one example, the processing unit 14 calculates a remaining range of the EV V1 based on the amount of the remaining energy of the battery 11 and the current operating condition of the EV V1. When the remaining range is too short for the EV V1 to reach the destination of the current trip, the processing unit 14 determines to trigger a charge request. In this case, the HMI 15 can remind the user that the EV needs to be charged, for example, by means of a visual alert on HMI, voice broadcast, or vibration. For example, an interface element of "Charge request" on the battery condition module 152 flashes. The user clicks the "Charge request" button and then the HMI 15 jumps to an interface showing the charge request module 153. In addition, the HMI 15 can also provide a broadcasted voice alert of "Charge request" inside the EV V1.

In block 508, the charge request module 153 generates the charge request.

In one example, the charge request module 153 includes three windows, i.e., a window of "Current battery condition", a window of "Destination" and a window of "Current position." Each of the three windows can receive user inputs or user edits such that the user inputs the information of the current battery condition, the destination, and the position into the charge request module 153. For example, each of the three windows includes a drop-down menu or a text box for receiving the user inputs or user edits. For example, information detected by the detection unit 12 is included in the drop-down menu of each window, so that the user can make a selection from the drop-down menu. The charge request module 153 also includes an "OK" button. After the user inputs to or edits all of the three windows, the user clicks the "OK" button. Then, the charge request module 153 generates the charge request. The charge request includes the current battery condition, the destination of the current trip, and the position of the EV.

In block 510, the charge request is sent to the server 20 via the communication unit 13.

In an example, before the charge request is sent out, the processing unit 14 encrypts the information included in the charge request to ensure security during the information transmission. After the server 20 receives the encrypted information, the encrypted information is correspondingly decrypted in the server 20.

In block 512, the server 20 receives the charge request.

In block 514, the server 20 calculates one or more candidate charging solutions.

In an example, the server 20 calculates a minimum charging amount and a maximum charging amount. The minimum charging amount is the least charging amount the EV requires to reach the destination. The maximum charging amount is the amount required to fully charge the battery 11 or charge the battery to a predetermined percentage. The predetermined percentage could be between 80% and 95%, for example, the predetermined percentage is set to 85% or 95%. Then, the server 20 determines a plurality of charging amounts (e.g., 3-5) between the minimum charging amount and the maximum charging amount. The plurality of charging amounts correspond to a plurality of levels between the minimum charging amount and the maximum charging amount. For example, the minimum charging amount is 10%, and the maximum charging amount is 95%. The plurality of charging amounts are respectively determined to be 15% for a first level between 10% and 20%, 30% for a second level between 20% and 40%, and 60% for a third level between 40% and 80%.

It is noted that the percentage described above is a percentage of the current battery capacity. For example, the current battery capacity is 50 AH, the percentage of 10% equals to 5 AH, i.e., 10% of 50 AH.

Additionally, the server 20 can set a distance threshold. The predetermined range is limited by the distance threshold. That is to say, the distance between an EV to be charged and a supply EV that supplies energy within the predetermined range should not exceed the distance threshold. The distance threshold can be adjusted. For example, the distance threshold is adjusted to be larger in the case of less traffic in rainy weather. The distance threshold is adjusted to be smaller in the case of many EVs in sunny weather and with good road conditions.

It is noted that the order of determining the charging amount and setting the distance threshold is not limited. The determination and the setting can be performed simultaneously or sequentially.

Next, the server 20 calculates a total fee corresponding to each of the charging solutions with different charging amounts and a reward for providing each of the charging amounts. Thus, the supply EV can know the reward that can be obtained for supplying the amount of energy. Moreover, the EV to be charged can know the total fee required for the charging.

In an example, the server 20 calculates the total fee of a charging solution based on the following equation (1).

$$C = V/I_1 * (T*I_2) * W_1 + S*T + D*W_2 \qquad (1)$$

where "C" is the total fee of the charging solution.

"V" is a unit price (e.g., RMB or USD) that varies with different charging amounts. For example, "V" is a fee per a unit charging time associated with the charging amount of one candidate charging solution.

"$I_1$" is a coefficient of the unit price V. For example, the logic for setting the coefficient $I_1$ is as follows: the larger the charging amount is, the smaller the coefficient $I_1$ is. The coefficient $I_1$ can be set according to the charging level, i.e., different charging levels correspond to different values of the coefficient $I_1$. In one example, the values of the coefficient $I_1$ are listed in Table 1 below.

"T" is a charging time associated with the charging amount. For example, T is a charging time required for completing the charging amount of one candidate charging solution. The charging time T can be calculated based on the charging amount and a charging rate.

"$I_2$" is a coefficient of the charging time T. The logic for setting the coefficient $I_2$ is as follows: the longer the charging time T is, the larger the coefficient $I_2$ is. The coefficient $I_2$ can be set according to the charging level, i.e., different charging levels correspond to different values of the coefficient $I_2$. In one example, the values of the coefficient $I_1$ are listed in Table 2 below.

"$W_1$" is a weight of the charging time T.

"S" is a base fee for charging.

"D" is a fee associated with a distance range from the EV to be charged, within which a potential supply EV could be located. In general, the fee D increases as the distance range from the EV to be charged increases, and the fee D decreases as the distance range from the EV to be charged decreases. The logic for calculating the fee D based on the distances range can be predetermined and adjusted according to user requirements. For example, the distance range could be pre-set in tiered levels, such as less than 1 km, between 1 and 2 km, between 2 and 5 km, and larger than 5 km. The respective value of D associated with such tiered levels of the distance range is preset to increase incrementally.

"$W_2$" is a weight of the distance "D".

The weights $W_1$ and $W_2$ can be the same or different. Both of the weights are preset. Each of the weights can be adjusted according to application scenarios. For example, one or both of the two weights can be adjusted according to a specific application scenario so that the fees corresponding to different levels of charging amounts are adjusted according to the specific application scenario.

The server 20 also calculates a reward that the supply EV can obtain for supplying the energy (e.g., providing the charging service). The reward can be an incentive payment, or other forms of an equivalent reward, such as coupons, award points, and a discount card. The user of the supply EV can use the reward to shop at a platform associated with the V2V charging system or enjoy a discount in the case that the supply EV itself needs to be charged in the future. The user of the supply EV can select his/her desired form of the reward. In an example, the incentive payment corresponds to the total fee of the charging solution. In another example, the server 20 determines the incentive payment to be higher or lower than the total fee according to a preset calculation logic.

In this way, the server 20 calculates a plurality of candidate charging solutions, each candidate charging solution includes a charging amount, a charging time, a total fee, and a reward corresponding to the charging amount.

The calculated charging solutions are transmitted to both the EV to be charged and the supply EV that supplies energy, and thus the user of the EV to be charged is informed of the total fee before the charging, rather than knowing the total fee only after the charging, where the total fee could have gone beyond his/her expectation. Moreover, the supply EV vehicle can be informed of the reward for providing the charging service before the provision of the charging service.

TABLE 1

Charging Amount-Coefficient $I_1$

| Charging Amount | Coefficient $I_1$ |
|---|---|
| 0%-20% | 0.4 |
| 20%-40% | 0.3 |
| 40%-60% | 0.25 |
| >60% | 0.2 |

TABLE 2

Charging Time-Coefficient $I_2$

| Charging Time | Coefficient $I_2$ |
|---|---|
| 10-20 minutes | 90% |
| 20-40 minutes | 100% |
| 40-60 minutes | 110% |
| >60 minutes | 120% |

In block 516, the server 20 selects a recommended charging solution from the plurality of candidate charging solutions. In one example, the server 20 selects the recommended charging solution based on the factor of battery health of the battery 11. In this example, the recommended charging solution is the charging solution that is best for the battery health of the battery 11 among the plurality of candidate charging solutions.

Specifically, the server 20 determines the charging solution that is best for the battery health of the battery 11 based on the following parameters of the battery 11: the remaining energy, the number of charge and discharge cycles, and the current battery capacity, and the server 20 selects the determined charging solution as the recommended charging solution. As to the determination of the charging solution that is best for the battery health of the battery 11, the following aspects can be considered:

how much should be charged to ensure that the remaining energy of the battery 11 will not be too low when the EV reaches the destination;

too many cycles of charge and discharge will degrade the capacity and performance of the battery 11; and a new battery can be charged more than a used battery.

In block 518, the server 20 sends the calculated candidate charging solutions including the recommended charging solution to the on-board system 10. For example, one of the calculated candidate charging solutions is marked as the recommended charging solution.

In block 520, the communication unit 13 receives the calculated candidate charging solutions including the recommended charging solution.

In block 522, the received information of the candidate charging solutions and the recommended charging solution is presented on the charging solution module 154. For example, as shown in FIG. 4D, the information of "Solution 1," "Solution 2," "Solution 3," and "Recommended solution" is presented in windows of the charging solution module 154. Each of the candidate charging solutions includes an amount of energy to be provided by the supply EV, a charging time and a total fee corresponding to charging such amount of energy. The reward for supplying the amount of energy can be expressed in one or more of incentive payment, coupons, award points, and a discount card. For example, as shown in FIG. 4D, the reward is expressed as the incentive payment of "20 RMB" or "40 RMB" or "70 RMB". In another example, it is possible to make an annotation in one of the windows to indicate the "recommended solution" without a separate window for presenting the "recommended solution." On the charging solution module 154, the information of a charging amount with which the EV can reach the nearest charging station is presented on the charging solution module 154. For example, as shown in FIG. 4D, the information of "Charge at least 5% to reach the nearest charging station" is presented on the charging solution module 154.

In block 524, the charging solution module 154 receives a user input indicative of which charging solution is selected by the user. The user may select the recommended solution or select a solution that is different from the recommended solution.

In one example, as shown in FIG. 4D, a window of "Selected solution" is presented on the charging solution module 154. The window can receive an input from the user to input his/her selection and display such selection.

In another example, the user clicks on one of the windows of "Solution 1", "Solution 2", and "Solution 3" to input his/her selection to the charging solution module 154. In this case, the window of "Selected solution" can be omitted.

In block 526, the communication unit 13 sends the selected charging solution to the server 20.

In block 528, the server 20 receives the selected charging solution.

In block 530, the server 20 sends the selected charging solution to EVs within a first predetermined range.

In block 532, the server 20 receives one or more responses from one or more EVs within a first predetermined time period. The first predetermined time period is a preset time period that starts to run at the time of sending the selected charging solution to supply EVs within the predetermined range. One or more responses are expected to be received by the server 20 within the first predetermined time period.

If no response is received during the first predetermined time period, the server goes back to block 532 and resends the selected charging solution to EVs within a second predetermined range that is wider than the first predetermined range and starts the second predetermined time period that is longer than the first predetermined time period in expectation of receiving one or more responses from supply EVs. The server will repeat blocks 530 and 532 with incrementally increased range and time period for a preset number of repeats. If still no response is received from any EV after such preset number of repeats, the server 20 sends a recommendation to the on-board system 10 for recommending the user to select another charging solution. The server 20 will repeat blocks 530 and 532 for the newly selected charging solution as described above until at least one response is received.

In block 534, the server 20 determines one of the EVs that respond to the request as the supply EV based on the distance of the supply EVs and charging amount they could offer.

In the case that the server 20 only receives one response from one EV, (e.g. EV V3), the server 20 determines that EV (EV V3) as the supply EV.

In the case that the server 20 receives two or more responses from two or more EVs, the server 20 calculates a matching degree for each of the two or more EVs based on the following formula (2), and determines the EV with the highest matching degree as the supply EV.

$$M = a*V'/b*D \qquad (2)$$

where "M" is the matching degree of an EV;

"V'" is an amount of the remaining energy of the EV, which corresponds to the maximum amount of energy that the EV can supply;

"D'" is a distance between the EV to be charged and the EV that supplies energy; and "a" and "b" are coefficients of V' and D', respectively. The coefficients "a" and "b" are preset and can be adjusted according to application scenarios.

As to the formula (2), in general, the greater the amount "V'" of the remaining energy of the EV, the higher the matching degree of that EV. The shorter the distance D' between the EV to be charged and an EV that supplies energy, the higher the matching degree of that supply EV. Moreover, the coefficients of "a" and "b" can be adjusted according to application scenarios, and thus a most suitable supply EV can be determined.

In block 536, the server 20 determines a suitable parking position for parking and charging. The suitable parking position shall be a position where the parking and charging are allowed according to relevant traffic regulations or traffic rules. The suitable parking position shall also be a position where the EV to be charged can reach with the remaining energy.

In block 538, the server 20 sends the suitable parking position to the EV to be charged and the supply EV, so that both vehicles travel to the suitable parking position.

In one example, the suitable parking position and the position of the supply EV are presented on the navigation module 151. For example, as shown in FIG. 4A, the suitable parking position "P2" and the supply EV "V2" are presented on the navigation module 151.

In one example, the EV to be charged is not equipped with a charging cable (i.e. a cable for V2V charging), the process further includes a process of dispatching the charging cable. In this example, the charging guide module 155 receives a user input indicative of whether the charging cable is needed. If the user input indicates the charging cable is needed, the communication unit 13 sends a request for dispatching or requiring the charging cable to the server 20. In this way, the EV to be charged can obtain the charging cable at the suitable charging location even if the EV is not equipped with the charging cable. Alternatively, the server 20 could include the requirement of the charging cable with the selected charging solution to be sent to the candidate supply EVs and select the suitable supply EV that is equipped with a charging cable.

In one example, a "charging guide diagram" is presented on the charging guide module 155 for providing guidance on the V2V charging. For example, the charging guide module 155 can guide the user to properly connect a charging connector (not shown) of the EV to be charged with a charging connector (not shown) of the supply EV at the suitable charging location to successfully complete the V2V charging.

Another embodiment of the disclosure relates to a method for V2V charging. The method can be implemented by the V2V system 100. Therefore, the above descriptions about the V2V system 100 are also applicable here.

Figure 6:
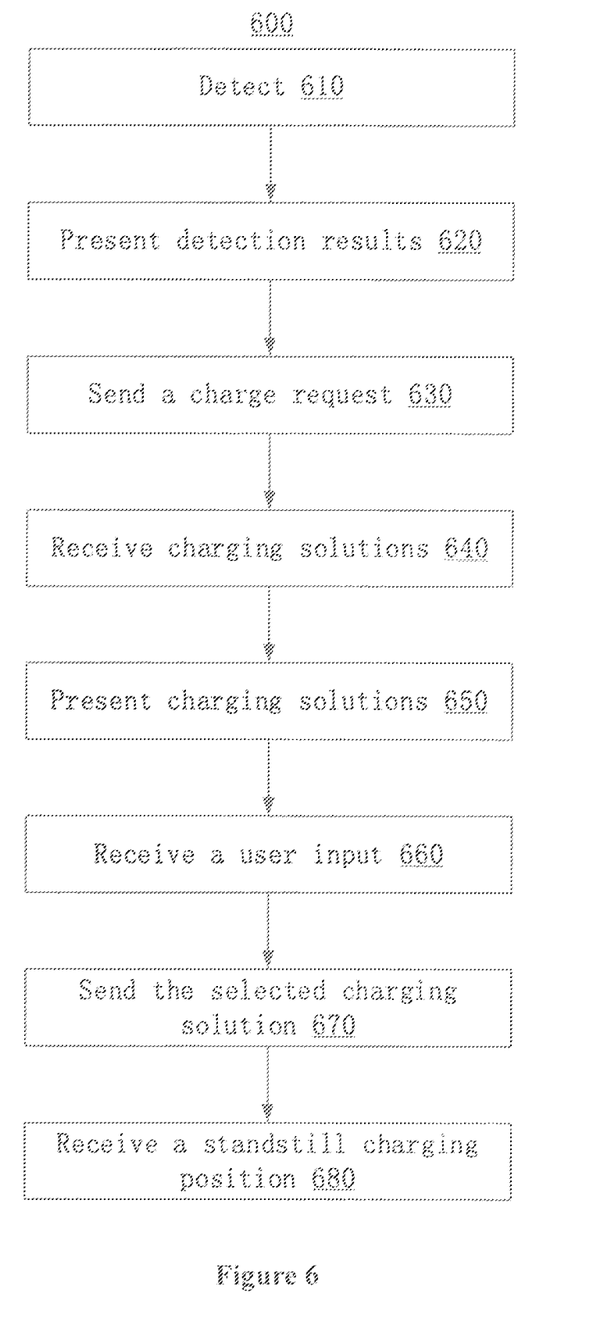
FIG. 6 is a flowchart of a V2V charging method according to an embodiment of the disclosure.

FIG. 6 illustrates a V2V charging method 600 according to an embodiment of the disclosure.

Referring to FIG. 6, in step 610, the detection unit 12 detects a position of the EV, a battery condition of a battery of the EV, and a destination of a current trip of the EV. The battery condition includes an amount of remaining energy, a number of charge and discharge cycles, and current battery capacity.

In step 620, the HMI 15 presents the detected information on an HMI of the EV.

In step 630, the communication unit 13 sends a charge request to a server if the EV cannot reach the destination with the amount of the remaining energy.

In step 640, the communication unit 13 receives one or more candidate charging solutions corresponding to the charge request from the server. Each candidate charging solution includes an amount of energy supplied by a supply EV, a charging time, and a total fee corresponding to charging the amount of energy.

In step 650, the HMI 15 presents the one or more candidate charging solutions.

In step 660, the communication unit 13 receives a user input indicative of a selected charging solution that is selected from the one or more candidate charging solutions.

In step 670, the communication unit 13 sends the selected charging solution to the server.

In step 680, the communication unit 13 receives a suitable charging location for the V2V charging from the server.

It is noted that all the operations in the method described above are merely exemplary, and the disclosure is not limited to any operations in the method or sequence orders of these operations, and should cover all other equivalents under the same or similar concepts.

The processors can be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), a state machine, a gate logic, a discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be interpreted broadly to represent instructions, instruction sets, code, code segments, program code, programs, subroutines, software modules, applications, software applications, software packages, routines, subroutines, objects, running threads, processes, functions, and the like. Software can reside on a non-transitory computer-readable medium. Such non-transitory computer-readable medium may include, for example, a memory, which may be, for example, a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to implement the various aspects described herein. Various modifications to these aspects will be readily apparent to those skilled in the art, and the general principles defined herein may be applied to other aspects. Thus, the claims are not intended to be limited to the aspects shown herein. All structural and functional equivalent transformations to the elements of the various aspects of the disclosure, which are known or to be apparent to those skilled in the art, are intended to be covered by the claims.

The invention claimed is:

1. A V2V charging system comprising an on-board system provided in an electric vehicle (EV), the on-board system comprising:
   a battery;
   a detection unit configured to detect a position of the EV, a battery condition of the battery, and a destination of a current trip of the EV, wherein the battery condition includes an amount of remaining energy of the battery, the battery's current charge and discharge cycles, and current battery capacity;
   a communication unit configured to send a charge request to a server and receive one or more candidate charging solutions each utilizing a supply EV corresponding to the charge request from the server, the communication unit being further configured to send a selected charging solution that is selected by a user from the one or more candidate charging solutions to the server and receive a suitable charging location from the server; and
   a human-machine interface (HMI), comprising:
      a navigation module configured to present the suitable charging location;
      an energy condition module configured to present the battery condition;
      a charge request module configured to generate the charge request including the position of the EV, the battery condition, and the destination;
      a charging solution module configured to present the one or more candidate charging solutions each of which comprises a charging amount as well as a charging time and a total fee associated with the charging amount; and
      a charging guide module configured to receive a user input indicative of whether a charging cable needs to be dispatched and present a guide diagram for providing guidance to complete V2V charging at the suitable charging location;
   wherein the communication unit is further configured to send a request for dispatching the charging cable to the server so that the EV can obtain the charging cable at the suitable charging location if the received user input indicates the charging cable needs to be dispatched.

2. The V2V charging system according to claim 1, wherein the on-board system further comprises a processing unit communicatively connected to the detection unit, the communication unit, and the HMI, respectively, the processing unit being configured to:
   calculate a remaining range of the EV based on the amount of the remaining energy and a current working condition of the EV; and
   trigger the generation of the charging request if the remaining range is insufficient for the EV to reach the destination.

3. The V2V charging system according to claim 1, wherein the charging solution module is further configured to:
   present a recommended charging solution, the recommended charging solution being a charging solution that is best for the battery's health among the one or more candidate charging solutions; and
   receive a user input indicative of whether the user selects the recommended charging solution or another candidate charging solution.

4. The V2V charging system according to claim 1, wherein each of the one or more candidate charging solutions further comprises a reward for supplying energy, the reward comprising at least one of an incentive payment, a coupon, reward points, and a discount card.

5. The V2V charging system according to claim 1, wherein the server is configured to:
   determine one or more charging amounts between a minimum charging amount with which the EV can reach the destination and a maximum charging amount with which the battery can be fully charged;

calculate the charging time and the total fee associated with each of the one or more charging amounts;
generate the one or more candidate charging solutions each of which comprises the corresponding charging time and the total fee; and
transmit the one or more candidate charging solutions to the on-board system.

6. The V2V charging system according to claim 5, wherein the server calculates the total fee for each candidate charging solution based on the following formula:

$$C=V/I1*(T*I2)*W1+S*T+D*W2$$

where C is the total fee;
V is a unit price that varies with different charging amounts;
I1 is a coefficient of the unit price V;
T is a charging time required for completing the charging amount of one candidate charging solution;
I2 is a coefficient of the charging time T;
W1 is a weight of the charging time T;
S is a base fee for the V2V charging;
D is a fee associated with a distance range from the EV to be charged; and
W2 is a weight of the fee D.

7. The V2V charging system according to claim 5, wherein the server is further configured to select a recommended charging solution based on the battery condition of the EV and the total fee for each candidate charging solution.

8. The V2V charging system according to claim 5, wherein the server is further configured to:
receive the selected charging solution from the on-board system;
transmit the selected charging solution to one or more EVs within a first predetermined range;
wait on responses from the one or more EVs with the first predetermined range for supplying energy within a first predetermined time period after transmitting the selected charging solution; and
determine the suitable charging location based on the position of the EV and a position of each responding EV.

9. The V2V charging system according to claim 8, wherein the server is further configured to perform one of the following operations to select the supply EV:
a) if only one EV responds to supply energy within the first predetermined time period after transmitting the selected charging solution, select said EV as the supply EV;
b) if two or more EVs respond to supply energy within the first predetermined time period, calculate a matching degree of each of said two or more EVs, and determine the EV with the highest matching degree as the supply EV;
c) if no response is received within the first determined time, re-transmit the selected charging solution to one or more EVs within a second predetermined range that is wider than the first predetermined range, wait on responses from the one or more EVs for supplying energy within a second predetermined time period that is longer than the first predetermined time, and
the server is further configured to transmit the suitable charging location to both of the EV to be charged and the selected supply EV.

10. The V2V charging system according to claim 9, wherein the server calculates the matching degree based on the following formula:

$$M=a*V'/b*D$$

where M is the matching degree;
V' is an amount of each responding EV's remaining energy;
D' is a distance between each responding EVs and the EV to be charged;
a is a coefficient of the amount V'; and
b is a coefficients of the distance D'.

11. The V2V charging system according to claim 9, wherein the server is further configured to:
generate a recommendation for recommending the user to select a new charging solution if no EV responds to supply energy within the second predetermined time period after re-transmitting the selected charging solution; and
send the recommendation to the on-board system.

12. A V2V charging system comprising an on-board system provided in an electric vehicle (EV), the on-board system comprising:
a battery;
a detection unit configured to detect a position of the EV, a battery condition of the battery, and a destination of a current trip of the EV, wherein the battery condition includes an amount of remaining energy of the battery, the battery's current charge and discharge cycles, and current battery capacity;
a communication unit configured to send a charge request to a server and receive one or more candidate charging solutions each utilizing a supply EV corresponding to the charge request from the server, the communication unit being further configured to send a selected charging solution that is selected by a user from the one or more candidate charging solutions to the server and receive a suitable charging location from the server; and
a human-machine interface (HMI), comprising:
a navigation module configured to present the suitable charging location;
an energy condition module configured to present the battery condition;
a charge request module configured to generate the charge request including the position of the EV, the battery condition, and the destination; and
a charging solution module configured to present the one or more candidate charging solutions each of which comprises a charging amount as well as a charging time and a total fee associated with the charging amount;
wherein the server is configured to:
determine one or more charging amounts between a minimum charging amount with which the EV can reach the destination and a maximum charging amount with which the battery can be fully charged;
calculate the charging time and the total fee associated with each of the one or more charging amounts;
generate the one or more candidate charging solutions each of which comprises the corresponding charging time and the total fee; and
transmit the one or more candidate charging solutions to the on-board system; and
wherein the server calculates the total fee for each candidate charging solution based on the following formula:

$$C=V/I1*(T*I2)*W1+S*T+D*W2$$

where C is the total fee;
V is a unit price that varies with different charging amounts;

I1 is a coefficient of the unit price V;
T is a charging time required for completing the charging amount of one candidate charging solution;
I2 is a coefficient of the charging time T;
W1 is a weight of the charging time T;
S is a base fee for the V2V charging;
D is a fee associated with a distance range from the EV to be charged; and
W2 is a weight of the fee D.

13. A V2V charging system comprising an on-board system provided in an electric vehicle (EV), the on-board system comprising:
   a battery;
   a detection unit configured to detect a position of the EV, a battery condition of the battery, and a destination of a current trip of the EV, wherein the battery condition includes an amount of remaining energy of the battery, the battery's current charge and discharge cycles, and current battery capacity;
   a communication unit configured to send a charge request to a server and receive one or more candidate charging solutions each utilizing a supply EV corresponding to the charge request from the server, the communication unit being further configured to send a selected charging solution that is selected by a user from the one or more candidate charging solutions to the server and receive a suitable charging location from the server; and
   a human-machine interface (HMI), comprising:
      a navigation module configured to present the suitable charging location;
      an energy condition module configured to present the battery condition;
      a charge request module configured to generate the charge request including the position of the EV, the battery condition, and the destination; and
      a charging solution module configured to present the one or more candidate charging solutions each of which comprises a charging amount as well as a charging time and a total fee associated with the charging amount;
   wherein the server is configured to:
      determine one or more charging amounts between a minimum charging amount with which the EV can reach the destination and a maximum charging amount with which the battery can be fully charged;
      calculate the charging time and the total fee associated with each of the one or more charging amounts;
      generate the one or more candidate charging solutions each of which comprises the corresponding charging time and the total fee; and
      transmit the one or more candidate charging solutions to the on-board system; and
   wherein the server is further configured to:
      receive the selected charging solution from the on-board system;
      transmit the selected charging solution to one or more EVs within a first predetermined range;
      wait on responses from the one or more EVs with the first predetermined range for supplying energy within a first predetermined time period after transmitting the selected charging solution; and
      determine the suitable charging location based on the position of the EV and a position of each responding EV.

* * * * *